United States Patent
Jester

Patent Number: 5,863,622
Date of Patent: *Jan. 26, 1999

[54] POLARIZER LAMINATES COMPRISING COEXTRUDED LIQUID CRYSTAL POLYMER MOIETIES AND INTEGRAL THERMOPLASTIC COVER LAYERS

[75] Inventor: Randy Douglas Jester, Greer, S.C.

[73] Assignee: Hoechst Celanese Corporation, Warren, N.J.

[*] Notice: The term of this patent shall not extend beyond the expiration date of Pat. No. 5,672,296.

[21] Appl. No.: 761,109

[22] Filed: Dec. 5, 1996

[51] Int. Cl.⁶ .................................................. G02F 1/1335
[52] U.S. Cl. .................... 428/1; 349/97; 349/96
[58] Field of Search ................ 428/1; 349/96, 349/97, 98

[56] References Cited

FOREIGN PATENT DOCUMENTS

| | | | |
|---|---|---|---|
| 0 352 637 A2 | 1/1990 | European Pat. Off. | ......... C09K 19/54 |
| 0 503 065 A1 | 9/1992 | European Pat. Off. | ......... B29C 47/06 |
| 0 608 924 A1 | 8/1994 | European Pat. Off. | .......... G11B 7/24 |
| 63-195602 | 8/1988 | Japan . | |
| WO 95/23180 | 4/1992 | WIPO | ................................ C08J 5/18 |

OTHER PUBLICATIONS

Database WPI, Section Ch, Week 8812, Derwent Publications Ltd., London, GB; Class A32, AN 88–080203 XP002052664 & JP 63 031 729 A (Sumitomo Bakelite Co), 10 Feb. 1998.

Database WPI, Section Ch, Week 9047, Derwent Publications Ltd., London, GB; Class A18, AN 90–351931 XP002052670 & JP 02 253 919 A (Daicel Chem Ind Ltd), 12 Oct. 1990.

*Primary Examiner*—Alexander Thomas
*Attorney, Agent, or Firm*—James L. McGinnis

[57] ABSTRACT

This invention discloses laminates comprising dyed liquid crystalline polymer based polarizers in the middle with a non-peelable, non-liquid crystalline polymeric cover layers, prepared by a process of coextrusion. The laminates are suitable to prepare liquid crystal display devices therefrom. An illustrative laminate comprises a dyed liquid crystal polymer as the polarizing film with polyethylene terephthalate as the cover layers.

17 Claims, No Drawings

POLARIZER LAMINATES COMPRISING COEXTRUDED LIQUID CRYSTAL POLYMER MOIETIES AND INTEGRAL THERMOPLASTIC COVER LAYERS

RELATED APPLICATIONS

The invention disclosed in this application is related to that in patent application U.S. Pat. application, Ser. No. 08/761,042 now U.S. Pat. No. 5,744,024 filed of even date herewith.

FIELD OF THE INVENTION

This invention relates generally to the field of polarizers for liquid crystal display applications, and specifically to liquid crystal polymer-based polarizers.

BACKGROUND OF THE INVENTION

Polarizers are important components of liquid crystal displays. Liquid crystal displays (LCDs) are widely used components in applications such as, for example, Notebook Personal Computers (PCs), calculators, watches, liquid crystal color TVs, word processors, automotive instrument panels, anti-glare glasses and the like. A useful review article, for example, is "Digital Displays" by in *Kirk-Othmer Encyclopedia of Chemical Technology,* Third edition, Volume 7, page 726 (1979), Wiley-Interscience Publication, John Wiley & Sons, New York. Typically, Polarizers are used in the form of film, the polarizer film (also called polarizing film). In an LCD, the liquid crystal elements are generally sandwiched between two layers of polarizing films.

Traditional polarizing films comprise a stretched polymer film such as, for example, polyvinyl alcohol (PVA), a dichroic absorber and other optional layers. The dichroic absorber is usually iodine or a dichroic dye that is absorbed in the polymer film. However, there are several disadvantages with such films that make them unsuitable for advanced and sophisticated applications. Some such disadvantages include, for example, non-uniformity, separation of the absorber over time, susceptibility to moisture and the like. For this reason, liquid crystalline polymer-based polarizers are being developed for polarizers. The process of molding or extrusion generally achieves a high degree of stable orientation in such polymers.

Pending U.S. Pat. application, Ser. No., 08/460,288, filed Jun. 2, 1995, now U.S. Pat. No. 5,672,296 discloses novel liquid crystalline polymer compositions useful in polarizer applications. Illustrative compositions disclosed therein are liquid crystalline polyesters which comprise repeat units corresponding to the formula:

wherein $P^1$, $P^2$ and $P^3$ represent monomeric moieties with $P^1$ being an aromatic hydroxy carboxylic acid, $P^2$ being an aromatic dicarboxylic acid and $P^3$ being a phenol; and m, n and q represent mole percent of the respective monomers ranging from 5–70 mole percent individually. Additional monomers may also be present. A preferred composition in the same patent is a film-forming wholly aromatic thermotropic liquid crystal polyester which comprises five monomeric moieties derived from 4-hydroxybenzoic acid, terephthalic acid, 4,4'-dihydroxybiphenyl, 6-hydroxy-2-naphthoic acid, and resorcinol in a molar ratio 30:20:10:30:10 respectively. Such LCPs are converted to polarizing films by combining them with suitable dichroic absorbers and then melt extrusion to yield the films. After melt extrusion, the polarizer films are subjected to further processing steps which include lamination to an optically transparent polymeric layer which is generally a thermoplastic. This lamination may require the use of adhesives depending on the adhesion of the polymeric layer to the melt extruded polarizer film.

Melt extruded LCP films, however, typically exhibit a degree of machine direction-oriented surface texture and therefore need polishing prior to further use. In the case of LCPs for polarizers, the films, especially in the required thickness of 1 mil (25 μm) or less, easily fibrillate and are also damaged easily during processes such as, for example, slitting and winding operations. Subsequent lamination of the polarizer films to the optically transparent polymeric layer preserves these defects and hence substantially reduces the utility of the film in devices where surface quality is critical for optical applications. Furthermore, preparing a polarizing film followed by further lamination to a thermoplastic involves extra steps which make the process uneconomical in addition to possible creation of additional defects.

One way to reduce the defects would be to coextrude the polarizer film with the optically transparent cover layer. This would avoid the separate lamination step later as well as the creation of additional defects on the polarizing LCP film. Coextruded laminates of LCPs containing other LCPs as surface layers on both sides are known. For example, U.S. Pat. No. 5,248,530 discloses such laminates prepared by coextrusion. Copending U.S. Pat. application, Ser. No. 08/761,042, now U.S. Pat. No. 5,744,204 filed of even date herewith, describes a coextrusion process for LCPs. In that case, the cover layers are non-adherent, and are peeled off after the coextrusion. A typical LCP for polarizer applications, on the other hand, is a mixture of an LCP polymer and a dichroic dye, where the dye has been dissolved in, blended with or absorbed in the LCP. A suitable process that provides a laminate from which the cover layers need not be peeled off will be highly useful for such LCPs.

There is a need for an improved polarizer laminate with improved surface characteristics.

It is an objective of this invention to provide improved quality LCP-polarizer laminates.

It is an additional objective of this invention to provide polarizing films with improved surface quality.

It is a further objective of this invention to provide LCP films which contain surface protecting films thereon that need not be delaminated during further processing steps.

It is a further objective of this invention to provide polarizer films which contain surface protecting films thereon that need not be delaminated but may be suitable for processing to a device by conventional processing methods.

It is a still further objective of this invention to provide polarizer laminates prepared by fewer number of steps and with fewer defects.

Other objectives and advantages of the present invention will be apparent to those skilled in the art as well as from the following description and Examples.

SUMMARY OF THE INVENTION

One or more of the foregoing objectives are achieved by the provision in the present invention of improved polarizer laminates. The laminates comprise an LCP-based polarizer film in intimate contact with surface layers of a suitable non-peelable, non-liquid crystalline polymer sheath on both sides of the polarizer film. The LCP-based polarizer film comprises a mixture of a suitable LCP and a dichroic absorber. Such improved laminate is prepared by a process comprising lining an LCP-based polarizer on both sides with the non-liquid crystalline polymer by a process of coextrusion. In one illustration, a suitable LCP-based polarizer is melted in a suitable extruder. The non-LCP polymer is also converted into a melt stream and coextrusion is performed such that the LCP film is lined on both sides by the non-LCP film to produce the inventive laminates. The external layers in the laminate provide sufficient strength to the LCP film during any subsequent processing steps such as, for example, winding, slitting and transport. The external layers are also suitable for further processing of the laminate to make liquid crystal display ("LCD") devices since those layers need not be peeled off (delaminated) and are compatible with such further processing steps.

DESCRIPTION OF THE INVENTION

In one embodiment, the present invention discloses improved polarizer laminates. The laminates comprise a polarizer film located between two integral layers of a non-liquid crystalline polymer. The term "integral" herein refers to the fact that the layers are not peeled off after lamination but stay as attached part of the polarizer. The polarizer film comprises a mixture of a liquid crystalline polymer and a dichroic absorber wherein the dichroic absorber is not covalently linked to he liquid crystalline polymer chain. The non-liquid crystalline polymer used for the cover layer (alternately referred to as the glazing layer or surface layer, or sheath herein) is preferably a thermoplastic polymer. The laminate is prepared by coextruding the polarizing film with the non-liquid crystalline polymer film. The coextruded laminates show a remarkable and significant improvement over conventional polarizer laminates. The latter are prepared by conventional monolayer extrusion, which is described, for example, in pending application, Ser. No. 08/460,288, now U.S. Pat. No. 5.672,296 followed by a separate lamination to a thermoplastic layer. The improved quality of the inventive laminates are clearly seen by optical micrograph examination.

The invention is particularly suitable for LCP-based polarizers. Examples of suitable LCP-based polarizers are disclosed in the above-mentioned pending patent application, Serial No. 08/460,288. The liquid crystal polymers in such polarizers may be liquid crystalline polyester, polyamide, polyesteramide, polyketone, polyether and the like. Liquid crystalline polyesters are preferred. A suitable LCP disclosed in the '288 application comprises repeat units corresponding to the formula:

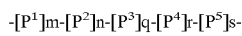

$$-[P^1]_m-[P^2]_n-[P^3]_q-[P^4]_r-[P^5]_s-$$

wherein $P^1$, $P^2$, $P^3$, $P^4$ and $P^5$ represent monomeric moieties with $P^1$ being an aromatic hydroxy carboxylic acid, $P^2$ being an aromatic dicarboxylic acid, $P^3$ being a phenol, $P^4$ being a second aromatic hydroxy carboxylic acid and $P^5$ being a second phenol; and m, n, q, r and s represent mole percent of the respective monomers with m, n and q ranging from 5–70 mole percent individually, while r and s range from 5–20 mole percent individually. Such liquid crystal polymers are combined with a suitable dichroic absorber suitably in order to form the polarizer. The dichroic absorber may be organic or inorganic; organic is preferred. A suitable organic dichroic absorber is a dye. Suitable dyes are selected from, for example, straight chain dyes, branched dyes, direct dyes, disperse dyes, solvent dyes and acidic dyes. Dyed LCP layers practiced in this invention are generally in the 4 to 40 μm thickness range.

A suitable non-liquid crystalline polymer which forms the cover layers for the inventive laminates is a non-liquid crystalline polymer, preferably a thermoplastic. Suitable thermoplastics include, for example, polyesters, polycarbonates, polyolefins, polyacrylates, polyestercarbonates, polyamides, polyketones, polyethers, cyclic olefin homopolymer, cyclic olefin copolymer ("COC") and the like. Important criteria for their selection include their optical clarity, low birefringence, as well as their thermal and mechanical properties. Preferred are the polyesters, many of which are well-known thermoplastics. Examples are polyethylene terephthalate ("PET") and polybutylene terephthalate ("PBT"). The cover layer thickness is generally in the 0.5 mil to 2 mil (2.5–50 μm) range in the practice of the present invention. The cover layer polymer on either side of the LCP may be the same or different polymer provided they have suitable optical, thermal and the like properties as noted above.

It is preferable that the surface polymer films possess good adhesion to the liquid crystal polymer film in the laminate. In such a case, one need not use an adhesive layer in between. If, however, the layers do not adhere well, or if one prefers still better adhesion, a suitable adhesive tie layer may also be present in the laminate, prepared in the same extrusion process. Suitable adhesives are commercially available such as, for example, the ADMER brand adhesive supplied by Mitsui Petrochemical Industries Limited, Tokyo, Japan. Suitable thickness for the adhesive tie layers are generally in the range 0.5 to 1 mil (2.5–25 μm). When an adhesive tie layer is used, the laminate construction would be surface layer/adhesive/LCP polarizer/adhesive/surface layer. Again, the same or different adhesives may be used provided they have suitable optical, thermal as well as curing properties.

The process of preparing an inventive laminate is illustrated in the Examples section below. The invention is illustrated with PET as the surface layers and a polarizer based on an LCP material disclosed in the '288 application and referred to as COTBPR therein. COTBPR comprises repeat units from 4-hydroxybenzoic acid, terephthalic acid, resorcinol, 4,4'-biphenol and 6-hydroxy-2-naphthoic acid in the respective molar ratio 30:20:10:30:10. COTBPR was blended with the dichroic dye Methylene Violet Bernthsen™ (from Aldrich Chemical Co., Milwaukee, Wis.) in order to make the polarizing material. The same PET material (a bottle grade PET resin from Hoechst Celanese Corporation, Somerville, N.J.) was used for the cover layer. Coextrusion was performed using the equipment and conditions described in the Examples section below to obtain the inventive laminate where the cover layers were integral parts of the laminate. The laminate was suitable for further processing steps as in conventional methods to fabricate devices such as, for example, liquid crystal display devices.

The present invention has several key advantages over prior known (monolayer extruded and then laminated) polarizer laminates and processes for preparing them. The advantages include ease of operation as well as cost advantages arising from the single coextrusion step versus multi-step production of polarizer film followed by lamination. Surface imperfections are significantly reduced. Quality advantages also exist due to the elimination of multiple steps where contaminates can be introduced into the laminate structure.

The following Examples are provided to further illustrate the present invention, but the invention is not to be construed as being limited thereto.

EXAMPLES

Example 1. Preparation of COTBPR

This example illustrates the preparation of COTBPR polyester from a 1 mole reaction mixture of 4-hydroxybenzoic acid ("HBA"), 6-hydroxy-2-naphthoic acid ("HNA"), terephthalic acid ("TA"), 4,4'-biphenol ("BP"), and resorcinol ("R") in the ratio 30:30:20:10:10.

To a 500 ml 3-neck flask equipped with a half-moon shaped TEFLON™ stirrer blade, gas inlet tube, thermocouple, a Vigreux column attached to a condenser and receiver were added the following:

a) 41.440 grams of 4-hydroxybenzoic acid (0.3 moles);
b) 56.456 grams of 6-hydroxy-2-naphthoic acid (0.3 moles);
c) 33.226 grams of terephthalic acid (0.2 moles);
d) 18.600 grams of 4,4-biphenol (0.1 moles);
e) 11.012 grams of resorcinol (0.1 moles);

the flask was immersed in an oil bath and provided with means to accurately control the temperature. The flask was thoroughly purged of oxygen by evacuation and then flushed with nitrogen three times, and slowly heated in the oil bath; and f) 0.02 grams of potassium acetate was added as a catalyst along with 105.48 grams of acetic anhydride (2.5% excess). Acetic acid began to distill over and was collected in a graduated cylinder.

The contents of the flask were heated while stirring at a rate of 2000 rpm to 200° C. over a period of 60 minutes at which time 10 ml of acetic acid had been collected. The reaction temperature was then gradually raised at a rate of about 1° C./ min to 320° C. at which time 96 ml of acetic acid had been collected. The flask was heated at 320° C. for another 60 min. A total of 110.5 ml of acetic acid had been collected. The flask was then evacuated to a pressure of 1.0 mbar at 320° C. while stirring. During this period the polymer melt continued to increase in viscosity while the remaining acetic acid was removed from the flask. The flask and its contents were removed from the oil bath and were allowed to cool to the ambient temperature. Polymer was then removed from the flask and a total of 120 grams of polymer was obtained.

The resulting polyester had an inherent viscosity (IV) of 2.0–2.4 dl/g as determined in a pentafluorophenol solution of 0.1 percent by weight concentration at 60° C. and a melt viscosity (MV) of 550 poise at a shear rate of $10^3$ sec$^{-1}$ measured at 230° C. in a capillary rheometer using an orifice of 1 mm diameter and 30mm length.

When the polymer was subjected to differential scanning calorimetry (10° C./ min heating rate), it exhibited a glass transition temperature (Tg) of 106° C. When the polymer was examined by hot-stage cross-polarized optical microscopy, it has a transition temperature from solid to liquid crystalline (Ts–>lc) at 170° C. The polymer melt was optically anisotropic.

Example 2. Preparation Of Dye Blended COTBPR By Melt Blending 60 grams of the COTBPR from Example 1 and 0.3 gram of Methylene Violet Bernthsen were charged into the mixing chamber of a Haake Mixer (Model # 3042309 from Haake Company, Paramus, N.J.). The mixing ball and its contents were heated to 240° C. over about 30 minutes and then the charge was blended at a rotational speed of 100 rpm for 10 minutes at the temperature. The mixture of polymer and dye was removed from the ball and allowed to cool to the ambient temperature.

Example 3. Coextrusion Experiments

A coextrusion was performed using a 2 inch extruder to extrude the dyed COTBPR in Example 2 and a 3.5 inch Egan extruder (from Egan Davis Standard, Somerville, N.J.) to extrude a bottle resin grade polyethylene terephthalate. The two melt streams were combined in a commercial ABA ("A" refers to the PET layers, and "B" refers to the dyed COTBPR layer) configuration feedblock (from Cloeren, Inc., Orange, Tex.) and extruded through a commercial 12" wide coathanger die (from Extrusion Dyes, Inc., Chippewa Falls, Wis.). Extrusion conditions are provided in Table 1:

TABLE 1

| Extruder | Material | Extrusion Temp (°C.) | Feedblock Temp (°C.) | Die Temp (°C.) | Rate (pph) | Line Speed (fpm) |
| --- | --- | --- | --- | --- | --- | --- |
| 3.5 inch | PET | 285° C. | 280° | 260° C. | 75 | 60 |
| 1.5 inch | Dyed COTBPR | 210° C. | 280° C. | 260° C. | 2.7 | 60 |

Under these conditions, a laminate with the structure of 1.4 mil PET/0.17 mil dyed COTBPR/1.4 mil PET was produced. The laminate structure exhibits good integrity under normal handling conditions. The inner COTBPR layer had a Hermans Orientation Factor (gaussion fit) of 0.88 and a dichroic ratio of 4, as measured by standard techniques. The PET glazing layers are unoriented.

Example 4. Coextrusion using an intermediate adhesive layer

PET, dyed COTBPR, and an adhesive tie layer (the ADMER brand adhesive supplied by Mitsui Petrochemical Industries Limited, Tokyo, Japan) are coextruded similar to the procedure in Example 3 to produce a PET/tie layer/dyed LCP/tie layer/PET structure having improved adhesion between the PET glazing layers and the LCP layer.

What is claimed is:

1. A laminate comprising a layer of a polarizing film located between two layers of an optically transparent, adherent polymer, wherein said polarizing film comprises a mixture of a liquid crystalline polyester and a dichroic absorber, and said adherent polymer is a non-liquid crystalline polymer, and further wherein said laminate is prepared by coextruding said polarizing film with said adherent polymer layer, and still further wherein said polyester comprises repeat units corresponding to the formula:

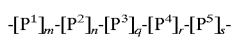

wherein $P^1$, $P^2$, $P^3$, $P^4$ and $P^5$ represent monomeric moieties with $P^1$ being an aromatic hydroxy carboxylic acid or aromatic amino carboxylic acid, $P^2$ being an aromatic dicarboxylic acid, $P^3$ being a phenol, $P^4$ being a second aromatic hydroxy carboxylic acid or aromatic amino carboxylic acid moiety different from $P^1$, and $P^5$ being a second phenolic moiety different from $P^3$; and m, n and q represent mole percent of the respective monomers ranging from 5–70 mole percent individually, and r and s represent mole percent of the respective monomers ranging from 5–20 mole percent individually, with m+n+q+r+s totaling 100 mole percent.

2. The laminate of claim 1, wherein said adherent polymer is a thermoplastic polymer.

3. The laminate of claim 2, wherein said thermoplastic is selected from the group consisting of polyester, polyolefin, polycarbonate, polyestercarbonate, polyamide, polyesteramide, polyketone, cyclic olefin homopolymer and cyclic olefin copolymer.

4. The laminate of claim 3, wherein said thermoplastic is a polyester.

5. The laminate of claim 4, wherein said polyester comprises repeat units from ethylene glycol and terephthalic acid.

6. The laminate of claim 4, wherein said polyester comprises repeat units from butylene glycol and terephthalic acid.

7. The laminate of claim 1, wherein said repeat units are moieties from 4-hydroxybenzoic acid, terephthalic acid, resorcinol, 4,4'-biphenol and 6-hydroxy-2-naphthoic acid.

8. The laminate of claim 1, wherein said dichroic absorber is organic or inorganic.

9. The laminate of claim 8, wherein said organic absorber is a dye selected from the group consisting of straight chain dye, branched dye, direct dye, disperse dye, solvent dye and acidic dye.

10. The laminate of claim 1, wherein said liquid crystalline polyester comprises repeat units moieties from 4-hydroxybenzoic acid, terephthalic acid, resorcinol, 4,4'-biphenol and 6-hydroxy-2-naphthoic acid, and said adherent polymer is polyethylene terephthalate.

11. The laminate of claim 1, further comprising one or more adhesive layers.

12. A laminate comprising a layer of a polarizing film located between two layers of an optically transparent, adherent polymer, wherein said polarizing film comprises a mixture of a liquid crystalline polyesteramide and a dichroic absorber, and said adherent polymer is a non-liquid crystalline polymer, and further wherein said laminate is prepared by coextruding said polarizing film with said adherent polymer layer, and still further wherein said polyesteramide comprises repeat units corresponding to the formula:

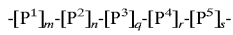

wherein $P^1$, $P^2$, $P^3$, $P^4$ and $P^5$ represent monomeric moieties with $P^1$ being an aromatic amino carboxylic acid, $P^2$ being an aromatic dicarboxylic acid, $P^3$ being a phenol, $P^4$ being an aromatic hydroxy carboxylic acid, and $P^5$ being a second phenolic moiety different from $P^3$, with m, n and q representing mole percent of the respective monomers ranging from 5–70 mole percent individually, and with r and s representing mole percent of the respective monomers, r and s being 5–20 mole %.

13. The laminate of claim 12, wherein said adherent polymer is a thermoplastic polymer.

14. The laminate of claim 13, wherein said thermoplastic is selected from the group consisting of polyester, polyolefin, polycarbonate, polyestercarbonate, polyamide, polyesteramide, polyketone, cyclic olefin homopolymer and cyclic olefin copolymer.

15. The laminate of claim 14, wherein said thermoplastic is a polyester.

16. The laminate of claim 15, wherein said polyester comprises repeat units from ethylene glycol and terephthalic acid.

17. The laminate of claim 15, wherein said polyester comprises repeat units from butylene glycol and terephthalic acid.

* * * * *